United States Patent [19]

Gamerdinger

[11] Patent Number: 4,986,621
[45] Date of Patent: Jan. 22, 1991

[54] OPTICAL HEAD ADAPTED TO RECEIVE A LIGHT GUIDE PLUG

[75] Inventor: Gustav Gamerdinger, Ammerbuch, Fed. Rep. of Germany

[73] Assignee: Wandel & Goltermann GmbH & Co., Eningen, Fed. Rep. of Germany

[21] Appl. No.: 394,077

[22] Filed: Aug. 15, 1989

[30] Foreign Application Priority Data

Aug. 20, 1988 [DE] Fed. Rep. of Germany ....... 3828318

[51] Int. Cl.$^5$ .................................................. G02B 6/36
[52] U.S. Cl. ................................................... 350/96.2
[58] Field of Search ................. 350/96.18, 96.15, 96.2, 350/96.21; 372/103

[56] References Cited

U.S. PATENT DOCUMENTS

| H491 | 7/1988 | Pitruzzello et al. | 350/96.18 |
| 4,268,799 | 5/1981 | McCrickerd | 372/103 |
| 4,723,257 | 2/1988 | Baer et al. | 350/96.18 |

OTHER PUBLICATIONS

Hewlett-Packard Journal Article, Feb. 1987, pp. 22-27, Precision Optical Heads for 850 to 1700 and 450 to 1020 Nanometers.

*Primary Examiner*—John D. Lee
*Assistant Examiner*—John Ngo
*Attorney, Agent, or Firm*—Herbert Dubno

[57] ABSTRACT

An optical head having a photoelectric converter at one end and a socket for a light guide plug at the opposite end, has a spring loaded apertured diaphragm adapted to press lightly against the front end of the plug when it is inserted into the socket. The diaphragm has a cylindrical aperture at its side turned toward the plug and an opening defined by a frustoconical surface widening in the direction of the converter. This surface and the rear wall of the diaphragm can be provided with a light absorbent coating or the surface can be reflective and the rear wall provided with a light absorbent coating.

8 Claims, 1 Drawing Sheet

OPTICAL HEAD ADAPTED TO RECEIVE A LIGHT GUIDE PLUG

FIELD OF THE INVENTION

My present invention relates to an optical head adapted to receive a light guide plug and, more particularly, to an optical head whose rear region can be provided with a photoelectric converter and which at its front region or part is formed with a socket for receiving a light guide plug.

BACKGROUND OF THE INVENTION

In the Hewlett-Packard Journal, February 1987, pages 26 and 27, there is described an optical head which, in a rear portion thereof, is formed with photoelectric converter circuitry outputting an electric signal, for example, based upon an incoming light signal. A front portion of this head is provided with an adapter body which constitutes a means for connecting a fiber optical light guide to the photoelectric device. The optical coupling between the photoelectric circuit and the fiber optics serving as an input, includes a socket at the front part of the optical head which receives a light guide plug at the end of the light guide which can be, as noted, a sheathed optical fiber or bundle of optical fibers.

In the conventional optical head described in this publication, detrimental reflections on inner parts of the head are suppressed, inter alia, by a light absorbing coating on the inner end of the adapter body and on the aperture diaphragm formed on the front side of the plug which surrounds the end of the light guide.

This apparatus, therefore, requires special plugs whose front side, like the rear side of the adapter body, must be formed with the light absorbing coating. These coatings are exposed upon withdrawal of the plug or dismounting of the adapter body, so that the coatings are subject to wear and damage.

Furthermore, the light guide must be adjusted with high precision in the plug since the end of the plug also forms the apertured diaphragm.

OBJECTS OF THE INVENTION

It is, therefore, the principal object of the present invention to provide an improved optical apparatus, especially an apparatus having a photoelectric converter for generating electrical output signals from a light input signal, whereby the drawbacks of the earlier apparatus as described are obviated.

Another object of my invention is to provide an improved apparatus of the type described in which internal reflection type disturbances can be suppressed without, however, requiring precision positioning of the light guide in the plug.

It is also an object of this invention to provide a system which will avoid problems with internal reflection and yet not require the plug to have a light absorbent coating which might be detrimentally affected by the handling of the plug, since the plug generally is designed to be repeatedly handled.

Still another object of the invention, collateral to the last mentioned object, is to allow the preceding objects to be obtained while nevertheless using a standard light guide plug, i.e. one which is not especially coated with a light absorbent coating so that a plurality of such standard plugs may be used interchangeably with the apparatus.

SUMMARY OF THE INVENTION

These objects and others which will become more readily apparent hereinafter are attained, in accordance with the invention in an optical head having a rear part provided with a photoelectric converter and a photoelectric cell serving as a light pickup for this circuit and a front part formed as a socket for a plug of a light guide and which comprises in an intermediate region between the socket and the circuit with an apertured diaphragm resiliently mounted for movement along the optical axis of the apparatus and hence the apparatus of the socket and the photocell and which is biased by a spring toward the front end of the light guide plug to lie against this front end.

The apertured diaphragm has a cylindrical aperture at its side turned toward the plug and which will hereinafter be referred to as the aperture of the diaphragm. The diaphragm is formed with a frustoconically diverging surface extending from this aperture rearwardly, i.e. to the end of a wall of the diaphragm turned toward the photoelectric converter. This surface thus extends from this wall to the aperture.

According to one aspect of the invention, this rearwardly conically diverging surface is formed with a reflective coating or as a mirrored surface, while the wall adjacent this surface is provided with a light absorbing coating which therefore covers the portion of the diaphragm which movably supports the aperture.

According to another aspect of this invention both the surface and the wall are coated with the light absorbing coating.

According to a feature of the invention, the three parts of the head are each formed as a separate element and can be assembled by screwthread connection or the like. For example, the socket can be formed by a replaceable adapter, e.g. a bushing, which is threaded into the diaphragm holder and can be interchangeable to allow different sizes of light guide plugs to be inserted. In turn, the diaphragm holder part can be threaded onto a rear portion of the housing carrying the photoelectric converter.

In the latter embodiment especially and in accordance with the invention generally, the diaphragm can form a wall extending perpendicular to the optical axis of an axially shiftable plunger or piston which is biased by a coil compression spring against the end of the plug when the latter is inserted into the socket.

Alternatively, the diaphragm may be resiliently mounted by a corrugated spring which can be of disk shape. A plate spring can thus serve for this purpose.

The advantage of the apparatus of the invention is that the optical head need have only a single light deflecting mirror surface or only a single light absorbing coating to protect the interior of the head against spurious reflections which might interfere with the operation of the device, while nevertheless allowing ordinary light guide plugs to be used. The light guide plugs, therefore, need not be provided with mirror surfaces or coatings, or with sensitive light absorbing coatings. The plugs need not be assembled with any great precision to the light guides and the adapter bodies themselves need not be especially provided with reflective or light absorbing coatings. Surprisingly, therefore, the reflective or nonreflective diaphragm surfaces fabricated as described can eliminate a host of problems which have in the past required special treatment of the plug, adapter parts and the like.

BRIEF DESCRIPTION OF THE DRAWINGS

The above and other objects, features and advantages of my invention will become more readily apparent from the following description, reference being made to the accompanying highly diagrammatic drawing in which.

SPECIFIC DESCRIPTION

Figure 1:
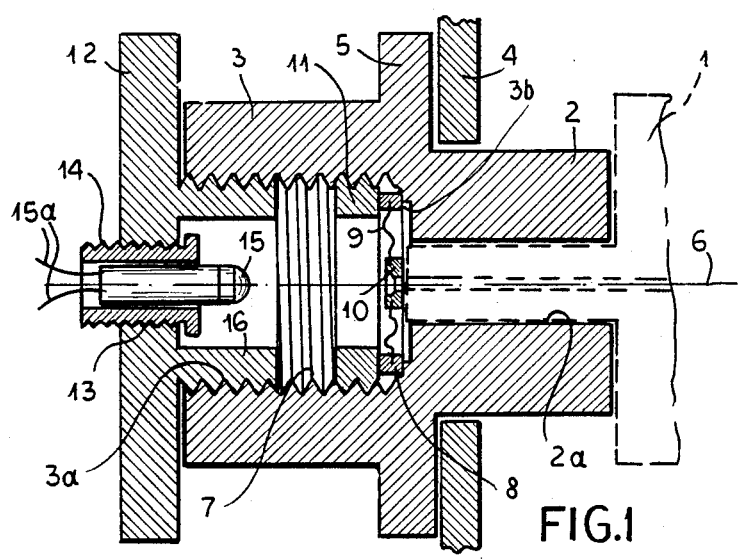
FIG. 1 is an axial cross sectional view illustrating a first embodiment of the apparatus of the invention having an apertured diaphragm whose diaphragm aperture is surrounded by a rearwardly diverging conical mirrored surface and is mounted in a plate spring.

The optical head shown in FIG. 1 comprises a socket 2 for a light guide plug 1 formed at the front portion of the optical head which has an intermediate portion 3 and a rear portion 12.

The intermediate portion 3 is formed with a flange 5 enabling the head to be mounted in a front plate of an apparatus, the flange being in one piece with the remainder of the part 3 and substantially symmetrical to an optical axis 6 which corresponds to the axis of the apparatus.

The parts 2 and 3 comprise a bore which is formed with a number of steps and are coaxial. For example, the bore part 2a of the front part is narrow and snugly receives the plug 1. A large diameter part 3a is formed with an internal screwthread 7. Between these two steps of the bore an intermediate step 3b is provided which is the axially shortest section of the bore, has an intermediate diameter and forms a shoulder for receiving a ring 8 which is press fitted into the member 2, 3 and carries a plate spring 9 with coaxial corrugations. The plate spring 9 centrally receives an apertured diaphragm 10, a portion of which is visible in enlarged form in FIG. 2. The ring 8 can be held in place by an externally threaded ring 11 screwed onto the thread 7.

The rear part 12 of the optical head is a disk shaped member with a boss 16 threaded into the screwthread 7 and provided with a tubular fitting 14 threaded into the bore 13 of plate 12 and receiving a photocell 15 which forms the photoelectric converter cooperating with the plug 1 and outputting electrical signals at 15a to a circuit (not shown) responsive thereto.

The axial extent of the front part 2 is so dimensioned that the front end of the light guide plug 1 engages the apertured diaphragm 10 under the elastic force of the plate spring 9, but so that this force is slight and the plug, therefore, displaces the apertured diaphragm 10 only to a slight extent in the direction of the photo diode 15.

Figure 2:
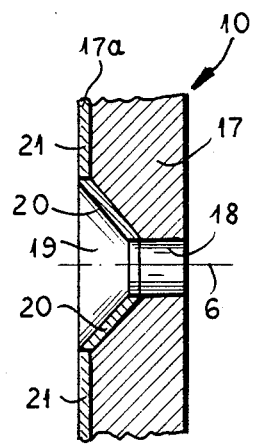
FIG. 2 is a section greatly enlarged in scale of an embodiment like that of FIG. 1 but when a reflective coating is provided for the mirror surface.

FIG. 2 shows a section through the apertured diaphragm drawn to a much greater scale. The apertured diaphragm 10 in this embodiment comprises a diaphragm body 7 formed with a central cylindrical diaphragm aperture 18 lying along the axis 6. A conical opening 19 is turned toward the photo diode 15 (FIG.1) and extends directly between the aperture 18 and the wall 17a of the body 17 turned to the rear. In FIG. 1 the surface of the opening 19 is made highly reflective or mirrored and FIG. 2 shows that a highly reflective or mirror coating 20 can be applied to this surface. The wall 17a directly adjoining the opening is formed with a light absorbent coat 21 and can reach directly to the mirror coating 20.

Figure 4:
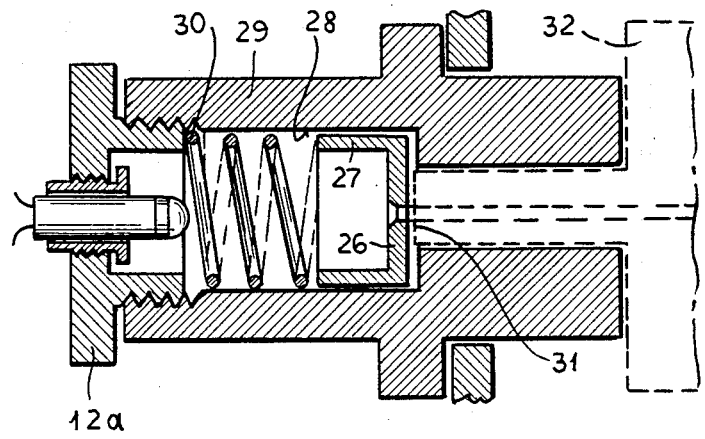
FIG. 4 is an axial section of an embodiment of the invention in which the aperture diaphragm forms part of a piston or plunger.

The coating 21 can extend also to the portions supporting the diaphragm for axial movement, for example, the plate spring 9 in FIG. 1, the interior of the piston or plunger in FIG. 4 and to other interior parts such as the L boss 16 and the threaded ring 11. In general, all interior surfaces of the parts 3 and 12 of the head can be so coated. In this manner, any light reflected within the head is reflected at an inclination to the axis and/or is suppressed by light absorption and interference is precluded with the signal transmitted through the head.

Figure 3:
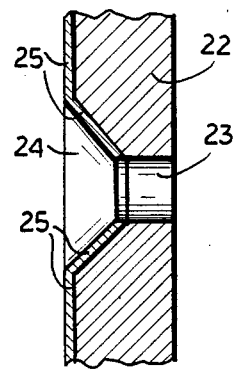
FIG. 3 is a view similar to FIG. 2 showing an alternative of the invention wherein the conical surface is provided with a light absorbing coat.

FIG. 3 shows a section through an apertured diaphragm of a second embodiment. The diaphragm body 22 has the central cylindrical diaphragm aperture aligned with the optical axis and a frustoconically diverging opening 24 extending from this aperture to the rear wall of the diaphragm i.e. the wall turned in the direction of the photo diode 15.

In this case, the conical diaphragm opening 24 and the rear wall, together with any axial movement supporting parts, including the interior parts of members 3 and 12 can be coated with the light absorbing coating 25 which reaches up to the cylindrical diaphragm aperture 23. All reflected light in the interior is thus suppressed and vagabonding is likewise limited.

In FIG. 4 is shown an embodiment of the invention in which the diaphragm structure of FIG. 2 or FIG. 3 can be applied as the bottom wall 26 of a piston or plunger 27 axially shiftable in a thread-free portion 28 of an intermediate region 29 of the head. In this case, the resilient force pressing the diaphragm against the front end 31 of the light guide plug 32 is generated by a coil spring 30 seated against the end of the boss of the plate 12a carrying the photoelectric device FIG. 5 differs from FIG. 4 in that the intermediate region 33 is threaded onto the plate 12b as previously described but does not form the plug directly in this case, the end 35 of the member 33 turned toward the plug 34 is formed with a threaded bore 36 which can receive a threaded nipple 37 of a replaceable adapter body so dimensioned that the plug 34 associated with that adapter will slightly press the aperture diaphragm 39 against the force of the spring 40 and be moved only slightly in the direction of the photo diode 41 upon insertion of the plug into the adapter. The nipple 37 may, as shown, project rearwardly into the space behind the threaded bore 36.

Figure 5:
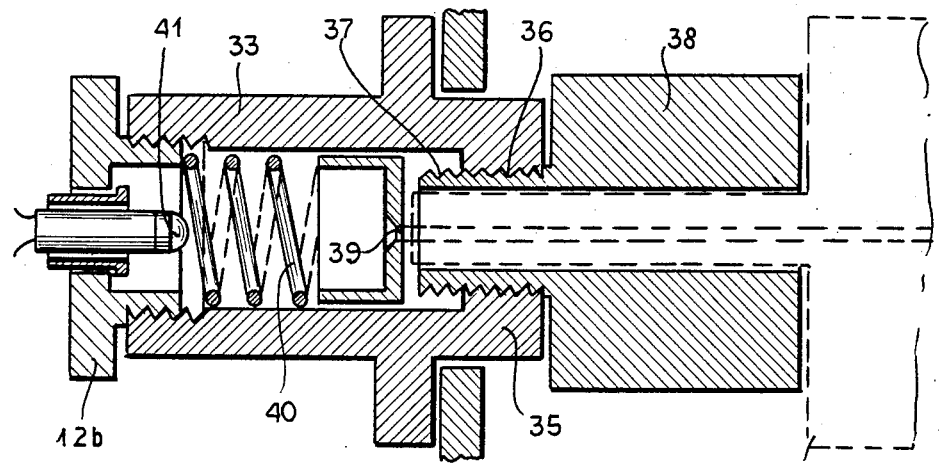
FIG. 5 is a view similar to FIG. 4 of a variant in which a removable, interchangeable or replaceable adapter forms the socket according to the invention.

Either of the diaphragm constructions illustrated in FIGS. 2 and 3 can be used in any of the structural embodiments of FIGS. 1, 4 and 5.

I claim:

1. An optical head comprising a rear part provided with a photoelectric converter disposed along an axis, an intermediate part surrounding said axis, a front part forming a socket for a light guide plug aligned with said axis, and a diaphragm in said intermediate part having an aperture in said diaphragm lying along said axis, and a spring pressing said diaphragm against a front end of said plug upon insertion of said plug into said socket, said diaphragm having a conical opening extending rearwardly from said aperture to a rear wall of said diaphragm turned toward said converter, said opening having a mirrored surface extending from said aperture to said rear wall, said rear wall and means supporting said diaphragm for axial movement being provided with a light absorbent coating in said head.

2. The optical head defined in claim 1 wherein said spring is a plate spring fixed in said intermediate part.

3. The optical head defined in claim 1 wherein said diaphragm forms part of a piston forming said means and axially shiftable in said intermediate part, said spring being a coil spring engaging said piston.

4. The optical head defined in claim 1 wherein said parts are separate from one another and interconnected together, said front part forming a replaceable adapter accommodating said head to a respective type of said plug.

5. An optical head comprising a rear part provided with a photoelectric converter disposed along an axis, an intermediate part surrounding said axis, a front part forming a socket for a light guide plug aligned with said axis, and a diaphragm in said intermediate part having an aperture in said diaphragm lying along said axis, and a spring pressing said diaphragm against a front end of said plug upon insertion of said plug into said socket, said diaphragm having a conical opening extending rearwardly from said aperture to a rear wall of said diaphragm turned toward said converter, said opening being formed by a frustoconical surface and being coated together with said rear wall and means supporting said diaphragm for axial movement in said intermediate part with a light absorbent coating.

6. The optical head defined in claim 5 wherein said spring is a plate spring fixed in said intermediate part.

7. The optical head defined in claim 5 wherein said diaphragm forms part of a piston forming said means and axially shiftable in said intermediate part, said spring being a coil spring engaging said piston.

8. The optical head defined in claim 5 wherein said parts are separate from one another and interconnected together, said front part forming a replaceable adapter accommodating said head to a respective type of said plug.

* * * * *